P. B. Hood,
Sad Iron,
No. 61,198.    Patented Jan. 15, 1867.
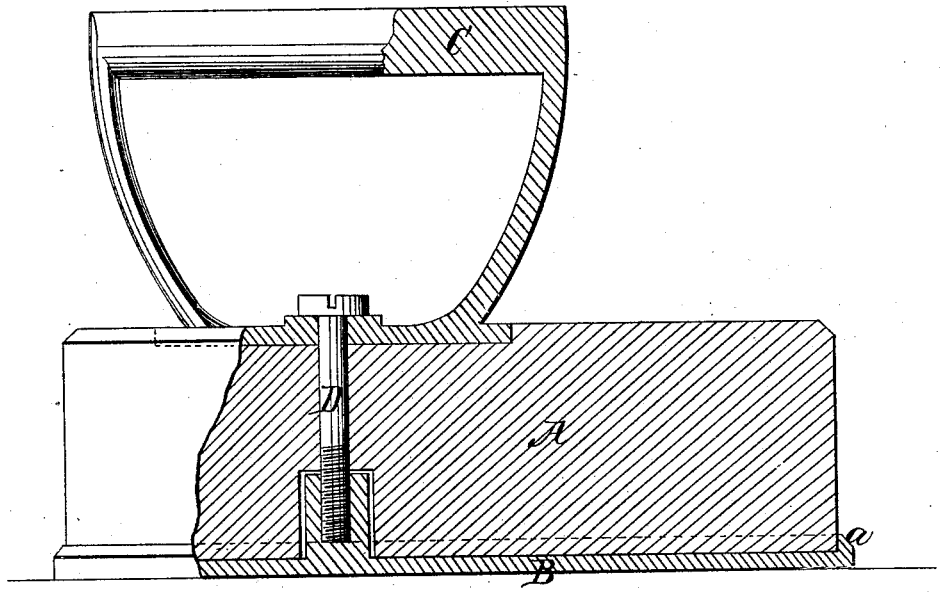
Witnesses;
Theo. Tusch
Wm. Trewrn
Inventor;
P. B. Hood
Per [signature]
Atty.

United States Patent Office.

PHINEAS B. HOOD, OF MILFORD, NEW HAMPSHIRE.

Letters Patent No. 61,198, dated January 15, 1867.

IMPROVED SAD-IRON.

The Schedule referred to in these Letters Patent and making part of the same.

TO ALL WHOM IT MAY CONCERN:

Be it known that I, P. B. HOOD, of Milford, in the county of Hillsborough, and State of New Hampshire, have invented a new and useful improvement in Sad-Iron; and I do hereby declare that the following is a full, clear, and exact description thereof, which will enable others skilled in the art to make and use the same, reference being had to the accompanying drawings, forming part of this specification.

My invention consists in constructing a sad-iron with a metallic face and handle, and with the body of the article composed of soap-stone.

The drawing represents a vertical section of my sad-iron.

A is the body of the sad-iron. B is the face, and C is the handle. D is a screw which holds the parts together. E is a nut attached to the face-plate. It is well known that steatite or soap-stone is a great heat-retaining substance, which renders it particularly adapted to purposes where frequent heating is not desirable. It is a substance considered almost infusible, and when heated it radiates its heat very slowly, except when in contact with metallic surfaces. It is this quality which renders it so valuable for the use to which I have applied it. In constructing the sad-iron after my plan, I form the face B with a flange around it sufficiently high to keep the stone in place, and the stone is so shaped on the bottom that it just sets within the flange; and on the face-plate $a$ is the flange. Through the stone there is a hole, the lower portion of which is large enough to receive the projection B on the plate, which forms a nut for the screw D. The handle C is set upon the top of the stone, or it may be sunk into it, as seen in the drawing. The screw D passes down through the handle and through the stone, and fits into the nut, as seen in the drawing, thus holding the three parts firmly together.

I do not confine myself to any particular metal for the face of the sad-iron, nor do I confine myself to steatite or soap-stone exclusively for the body of the sad-iron. Other varieties of free-stone may be used, and also compositions of different kinds; but I prefer the soap-stone.

What I claim as new, and desire to secure by Letters Patent, is—

A sad-iron composed of a metallic face, and with a body of soap-stone, when constructed and arranged substantially as herein shown and described.

PHINEAS B. HOOD.

Witnesses:
  BAINBRIDGE WADLEIGH,
  CHARLES W. LIVERMORE.